Jan. 5, 1926.　　　　　　　　　　　　　　　1,568,875
R. G. CAMBLIN
HEADLIGHT FOR AUTOMOBILES
Filed Nov. 8, 1924　　　　　　2 Sheets-Sheet 2
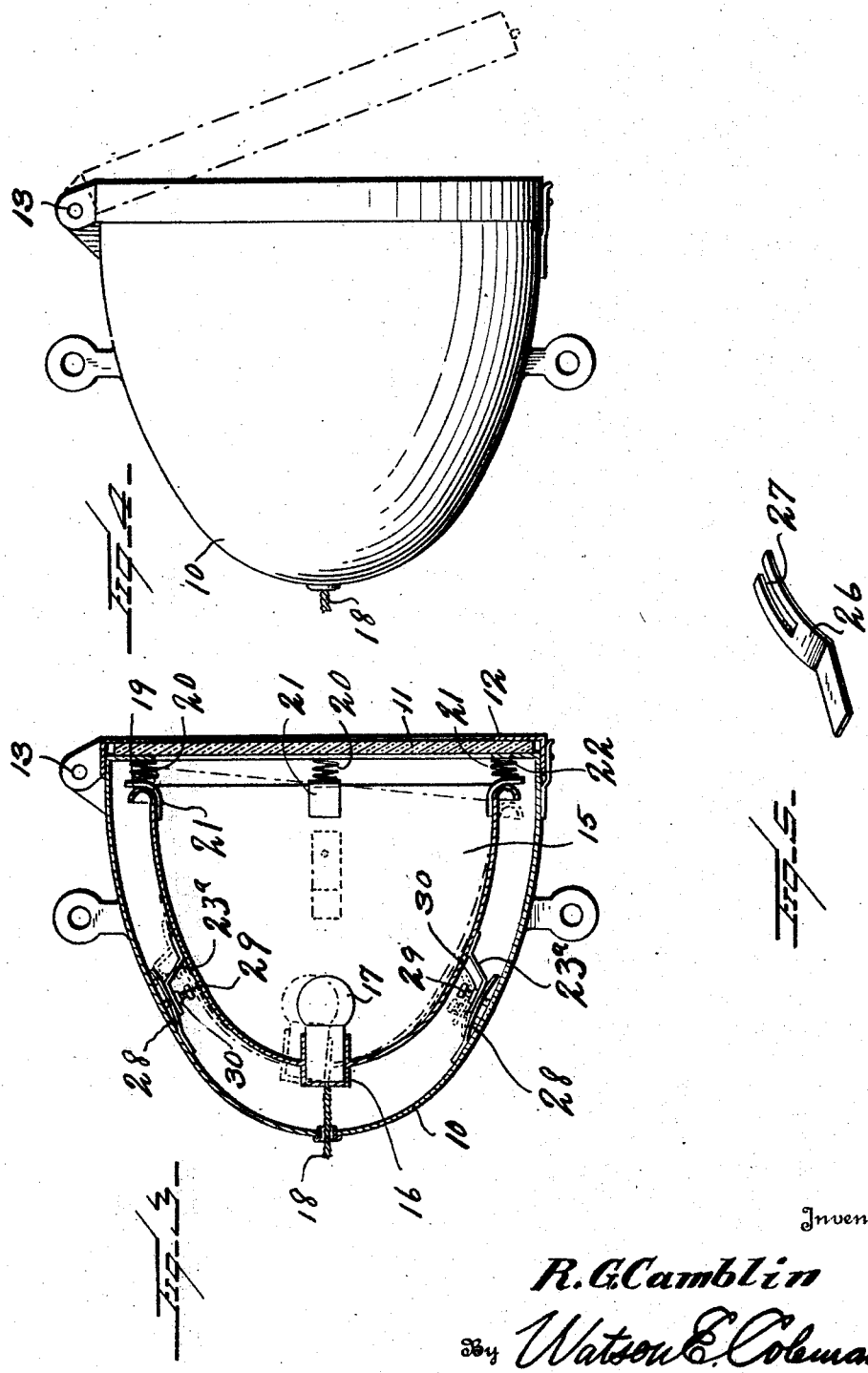
Inventor
R. G. Camblin
By Watson E. Coleman
Attorney Patented Jan. 5, 1926.

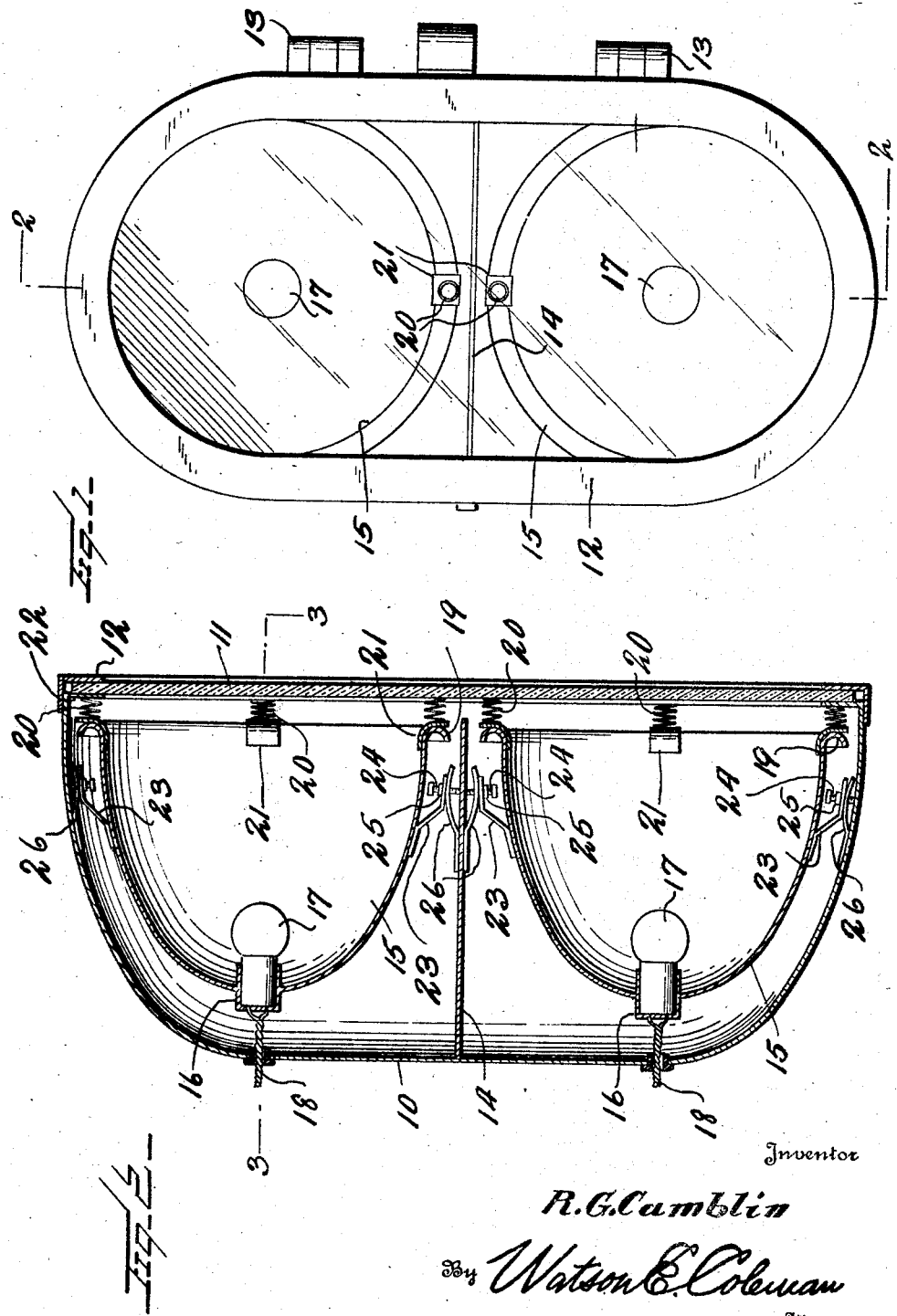

1,568,875

UNITED STATES PATENT OFFICE.

ROBERT G. CAMBLIN, OF BARTLESVILLE, OKLAHOMA, ASSIGNOR OF ONE-HALF TO ANTHONY R. EDMONDSON, OF BARTLESVILLE, OKLAHOMA.

HEADLIGHT FOR AUTOMOBILES.

Application filed November 8, 1924. Serial No. 748,732.

*To all whom it may concern:*

Be it known that I, ROBERT G. CAMBLIN, a citizen of the United States, residing at Bartlesville, in the county of Washington and State of Oklahoma, have invented certain new and useful Improvements in Headlights for Automobiles, of which the following is a specification, reference being had to the accompanying drawings.

This invention relates to headlights for automobiles, and particularly to those headlights wherein there is an outer casing and an interior reflector disposed within the casing and shiftable to cast the light either downwardly or directly forwardly or laterally.

The general object of the invention is to provide a headlight on each side of the automobile, each headlight containing two reflectors, each of these reflectors being mounted for adjustment so that the axis of the reflector will be either downwardly and forwardly or directed laterally and forwardly and downwardly and laterally so that one of these reflectors may be directed downwardly and forwardly in the usual position of an ordinary reflector, while the other reflector will be directed toward the ditch side of the machine so that when an automobile meets another automobile the driver may switch off the lamp in the forwardly directed reflector and switch on the lamp in the laterally directed reflector to thereby prevent the glare from the first named lamp from striking in the eyes of the oncoming motorist.

A further object is to provide a construction of this character in which either lamp is capable of adjustment so that either lamp may be used as the ordinary forwardly directed headlight and the other reflector may be used for casting the light laterally and forwardly toward the ditch side of the machine.

A still further object in this connection is to provide a headlight having the two reflectors and two lamps, as stated, these lamps being relatively adjusted so that at any time the driver desires to see the side of the road or a vehicle on the right side of the road, it is only necessary to switch off the driving lights, as they may be turned, and switch on the laterally directed lights.

Another object accomplished by my invention is to do away with mechanism which must be adjusted by the driver at the time when he desires to take the glare from an oncoming motorist's eyes or desires to direct the light to the side of the road by providing reflectors which, while they may be adjusted whenever desired, are adjusted and then left in their adjusted position.

Other objects have to do with the details of construction whereby the reflectors are supported within the outer housing and whereby they are adjusted.

My invention is illustrated in the accompanying drawings, wherein:—

Figure 1 is a front elevation of a headlight constructed in accordance with my invention;

Figure 2 is a section on the line 2—2 of Figure 1;

Figure 3 is a horizontal sectional view on the line 3—3 of Figure 2;

Figure 4 is a top plan view of the headlight shown in Figures 2 and 3;

Figure 5 is a perspective view of one of the clips 26.

Referring to these drawings, and particularly to Figure 2, it will be seen that I provide a lamp housing 10 which, as shown in Figure 1, is, generally speaking, elliptical in form or elongated vertically and which is provided with a glass pane 11 extending across the entire headlight and supported in a frame 12, this frame having hinges 13 or being otherwise mounted upon the body 10 so that the front may be opened. This frame 12 holds the pane 11 in place. Any construction of this character may be used and I do not wish to be limited to any particular means for mounting this elongated body upon an automobile, it being understood, however, that there are two of these housings or bodies 10, one on each side of the machine.

The housing 10 is preferably divided through its middle by a horizontally extending wall 14 which does not extend quite to the pane 11, thus dividing the lamp housing into two compartments. In each compartment there is arranged a parabolic reflector 15, the rear end of this reflector being formed with a socket 16 to receive the base of the usual incandescent lamp 17. Electrical connections 18 extend outward from this lamp and out through the back of the housing 10, being suitably insulated from the housing. The forward end of each reflector is illustrated as being rounded or formed with a bead 19, and engaging against this bead at the upper and lower edges of the reflector are springs 20, these springs bearing against small curved plates 21 which approximately fit the bead 19 to afford a flat bearing surface for the springs 20. The outer ends of the springs 20 bear against a flange 22 extending inwardly from the housing 10, against which flange the pane 11 also bears.

For the purpose of adjusting the reflectors either into a position where the beam directed from the reflector is cast laterally and forwardly or cast straight ahead, I provide, as illustrated in Figure 2, the resilient ears, designated 23, which are attached to the reflector 15 against the upper and lower walls thereof in any suitable manner, these ears projecting outward and forward and then nearly straight forward. Passing through each ear is an adjusting screw 24 which carries upon it a set nut 25. Mounted upon the wall of the housing 10 and of the partition 14 opposite the two ears 23 is a spring clip 26 which is slotted, as illustrated in Figure 5, and which is somewhat curved, this spring clip bearing against the ear 23. The screws 24 being disposed in the slots 27 of these clips 26 act as pivots upon which each reflector may be turned to throw the light laterally, these pivots being disposed in a vertical plane so that the reflector may be turned upon these vertical pivots, the springs 20 yielding, of course, to permit such movement of the reflector. The lamp is held in this oscillated position by means of the lugs and clips illustrated in Figure 3. By this figure it will be seen that each lamp is provided upon its side wall, as distinguished from the upper and lower walls, with an angular ear 23ª, while the housing is provided with the clip 28 formed in the same manner as the clip shown in Figure 5 and longitudinally slotted. A screw 29 passes through this ear 23ª and through the slot of the clip 28 and carries upon it the nut 30.

It will be obvious now that by rotating one nut 30 in one direction and releasing the other nut that the reflector will be resiliently held in the dotted line position shown in Figure 3, that is tilted upon its pivots 24, so that the axis of the reflector is directed forwardly and laterally, the ears 23ª on the two sides of the reflector slipping over the faces of the spring clips 28, while the screws engage the inner face of the housing 10. Thus the reflector is held in place laterally tilted. If it be desired to tilt the reflector vertically, the screws 29 are loosened, the reflector is tilted with its axis downward and forward so that the upper edge of the reflector compresses the spring 20, and the spring 20 at the lower end of the reflector expands and the screws 24 are tightened so as to engage the partition 14 and the housing 10 to hold the device in this set position, the screws 29 under these circumstances acting as pivot screws.

In order to adjust these reflectors as desired, the reflectors will be drawn out of the housing, then the adjusting screw on one side or the other will be tightened and the other adjusting screw loosened, the reflector put back within the housing, and the reflector will focus or direct its light either to one side or the other or either up or down. The springs 20 will act to hold the reflectors pushed back so that the screws will be at the rear ends of the slots 27 and thus the reflector is held rigidly in place by the pressure of the springs. Some cars have the aprons or fenders projecting some distance out in front so that under these circumstances the lower reflectors could not be used for directing the light toward the right side of the road and in that case the upper lights are used for passing and the lower lights for driving. It is for this reason that I have made both the upper and lower reflectors adjustable so that either may be used for driving and either may be used for passing.

Most of the headlights on automobiles are unhandy to focus, that is to direct. It is necessary to use a wrench and unscrew a few nuts and bolts and pry the headlights around. These reflectors can be pulled right out of the housing, then the nuts loosened or tightened a little on one side or the other, and the reflectors put back in place and everything is adjusted. The conductors passing from the lamps will, of course, be connected to any ordinary switch whereby the lower lamps may be connected in circuit with a source of energy or the upper lamps connected in a circuit with a source of energy, this switch being mounted upon the dash board or upon the steering wheel as desired.

With this construction there is no danger of blinding the oncoming motorist nor at the same time is there any necessity of dimming the lamps. The lamps are always in adjustment so that one pair or the other may be used as circumstances direct.

I claim:—

1. In a headlight for automobiles, a housing, a reflector mounted within the housing and having a lamp, the reflector having outwardly and longitudinally projecting ears, resilient clips mounted upon the housing and having longitudinally extending slots, and screws passing through the ears and through said slots and engaging the wall of the housing to thereby support the reflector in spaced relation to the housing and in adjusted position therein.

2. In a headlight, a housing, a reflector mounted within the housing, ears carried by the reflector and extending outward from the housing and longitudinally approximately parallel to the housing, resilient clips mounted upon the inner face of the housing and longitudinally slotted, and screws passing through the longitudinally directed portions of the ears, through the slots in the clips and engaging the wall of the housing, the reflector being thus removable through the open front of the housing and being adjustable to place its optical axis into or out of coincidence with the optical axis of the housing.

3. A headlight of the character described comprising a housing having a transparent pane at its forward end, the pane being mounted for removal from in front of the housing, a reflector disposed within the housing and carrying a lamp, means for supporting the reflector within the housing comprising ears mounted upon the reflector and extending toward the housing, said ears at their outer ends being extended approximately parallel to the adjacent wall of the housing, spring clips mounted upon the wall of the housing and having portions confronting the longitudinally extending portions of the ears, said last named portions being slotted, screws passing through the ears and through the slots of the clips and bearing against the inner face of the housing, and set nuts whereby the screws may be held in adjusted position.

4. A headlight of the character described comprising a housing having a transparent pane at its forward end, the pane being mounted for removal from in front of the housing, a reflector disposed within the housing and carrying a lamp, means for supporting the reflector within the housing comprising ears mounted upon the reflector and extending toward the housing, said ears at their outer ends being extended approximately parallel to the adjacent wall of the housing, spring clips mounted upon the wall of the housing and having portions confronting the longitudinally extending portions of the ears, said last named portions being slotted, screws passing through the ears and through the slots of the clips and bearing against the inner face of the housing, set nuts whereby the screws may be held in adjusted position, and springs operatively bearing against the end of the reflector at a plurality of points and urging the reflector inward toward the rear end of the housing.

In testimony whereof I hereunto affix my signature.

ROBERT G. CAMBLIN.